Patented June 2, 1953

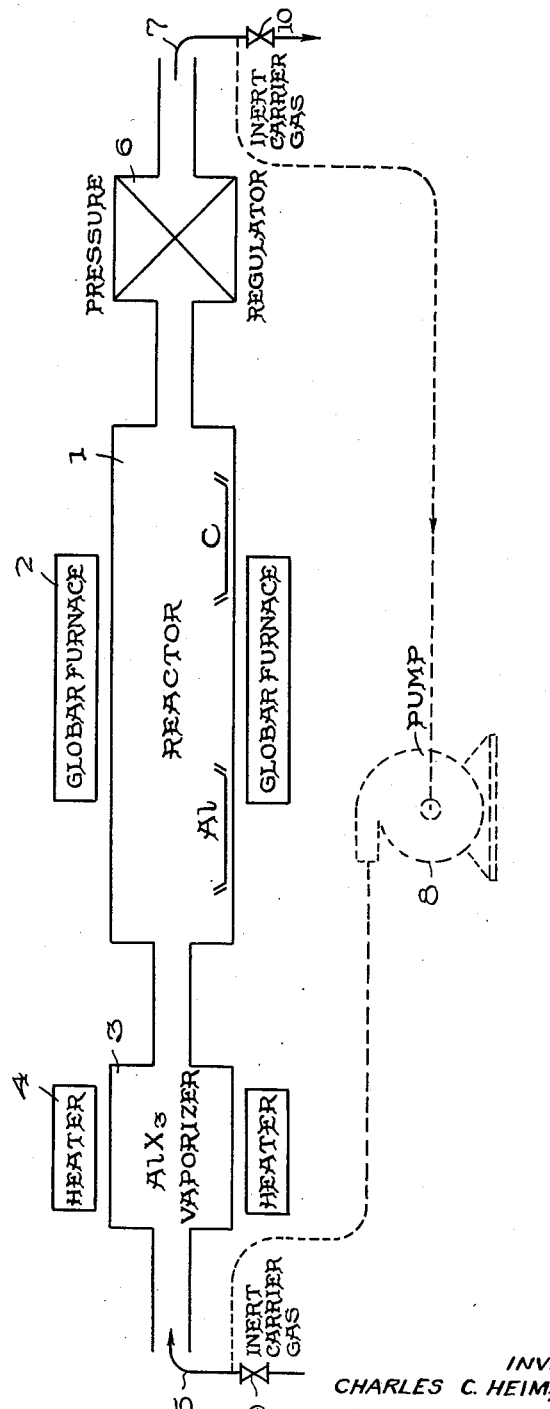

2,640,760

UNITED STATES PATENT OFFICE 2,640,760

METHOD OF PRODUCING ALUMINUM CARBIDE

Charles C. Heim, deceased, late of Spokane, Wash., by Pauline Bailey Heim, executrix, Essex Junction, Vt., assignor to Kaiser Aluminum and Chemical Corporation, Oakland, Calif., a corporation of Delaware Application January 16, 1952, Serial No. 266,716

12 Claims. (Cl. 23—208)

This invention relates to a method of producing aluminum carbide, and more particularly relates to a method of producing high purity aluminum carbide by a gas-solid phase reaction employing a halide of aluminum in gaseous phase.

Previous methods of producing aluminum carbide from aluminous material have generally involved a mixing of aluminous material with carbon and reacting the mixture at high temperatures. From such reaction the resultant yield of aluminum carbide is quite low, usually less than 50 per cent, and such methods necessitate heating the mixture at high temperatures, on the order of 1500° C. in order for any substantial rate of reaction to be accomplished.

It is a primary object of this invention to produce aluminum carbide by a novel method, whereby the yield and purity of aluminum carbide are greatly increased.

It is a further object of this invention to produce aluminum carbide at reaction temperatures substantially less than heretofore practicable.

Another object of this invention is to present a method whereby aluminum carbide is produced by a vapor process employing a volatile halide of aluminum.

These and other objects will be apparent from the following description of the process.

It has now been discovered that the reaction of aluminum with carbon to form aluminum carbide may be accomplished more efficiently and at a considerably reduced reaction temperature when carried out in the presence of a gaseous halide of aluminum.

Briefly stated, the production of aluminum carbide by the process of the invention is accomplished by passing vaporized aluminum halide over a heated mixture of carbon and aluminum metal.

In accomplishing the aforementioned improved yield and lower reaction temperature, the process contemplates the mixing of a metallic aluminum material, such as finely-divided 99.9 per cent aluminum, with finely-divided carbon, heating the mixture in an inert atmosphere at a pressure of 100 to 2000 mm. Hg and at a temperature in the range of 900 to 1300° C., vaporizing aluminum halide and passing such vapor with or without an inert carrier gas, such as helium, to a reactor containing the mixture of aluminum material and carbon, maintaining the reaction under such conditions until substantial completion, followed by cooling and extracting the aluminum carbide product from the reactor.

Although the theory of the chemical reactions which take place is not thoroughly understood, it is postulated that a monohalide compound of aluminum is formed by the reaction of vaporized aluminum trihalide and aluminum, which monohalide compound of aluminum in turn reacts with the carbon to form aluminum carbide, the desired compound. The aluminum trihalide is regenerated by the monohalide-carbon reaction and is available for reuse.

The accompanying figure diagrammatically illustrates one embodiment of the invention wherein the aluminum material and carbon in particulate form are placed in a reactor 1 which is heated to the requisite reaction temperature by a heating means, such as a globar furnace 2. The aluminum halide vaporizer 3 is likewise maintained at a temperature at which substantial sublimation or vaporization of the halide occurs by suitable heating means, such as sleeve heater 4. Inert carrier gas, such as helium, from a suitable source may be supplied as at 5 with the reactor and aluminum trihalide vaporizer at operating temperatures. The gaseous aluminum trihalide and inert carrier gas, if the latter is utilized, are caused to flow into the reaction chamber, where the aluminum-carbon mixture is reacted with the trihalide vapor and the reformed trihalide vapor and inert carrier gas pass out of the chamber and thence through a pressure regulator 6, being removed as indicated at 7. The trihalide may be recovered for reuse. Alternatively, the aluminum trihalide and the inert gas may be recycled to the input end of the system 5 by means of pump 8, keeping valves 9 and 10 closed. The aluminum trihalide vaporizer 3 is preferably maintained at a temperature sufficient to produce a partial pressure of the aluminum halide contained therein of at least 100 mm. Hg. The pressure regulator 6 is adjusted to operate so that a pressure on the order of atmospheric is preferably maintained in the reactor 1 during the course of the reaction. Optimum temperature is about 1100° C. However, the practical operating conditions may include a reactor temperature range of from about 900 to 1300° C. and a pressure range from 100 to 2000 mm. Hg. The powdered aluminum material and carbon may be placed in the reactor as a mixture, but may also advantageously be placed in spaced relation in the reactor so that the incoming gaseous trihalide and inert carrier gas will first react with the powdered aluminum material, the monohalide formed by such reaction then being delivered downstream with the vapor flow to contact the carbon and react therewith, forming aluminum carbide. By means of this alternative, a lower purity aluminum material may be employed where the impurities are not vaporized at reaction temperatures and pressure, while still obtaining high purity aluminum carbide without necessitating any subsequent separation.

When using the materials as a mixture, it is preferred to maintain a weight ratio of aluminum to carbon close to stoichiometric, for example, from 3 to 1 to 4 to 1. When operating with the reactants in spaced relation, an excess of aluminum is preferred, and the ratio should be at least 4 to 1.

The aluminum halide may be any of the volatile halides, that is, those which are readily vaporized or sublimed to exert at least 100 mm. Hg partial pressure at normal or atmospheric pressure and temperatures well below the reaction temperature range. Accordingly, the fluoride which sublimes at about 1260° C. at atmospheric pressure is excluded from the term "volatile aluminum halides" while the chloride, bromide, iodide and mixtures thereof are included.

Although aluminum iodide is operable in the performance of the invention, the bromide and more preferably the chloride, are particularly advantageous for reasons of economy, the latter being the preferred species. While 99.9 per cent aluminum is preferred as a starting material, aluminum alloys and impure aluminum may be used as starting materials. The inert carrier gas, when used, may be helium or any other of the inert gases appearing in group 8 of the periodic table, helium being preferred for reasons of economy and ready availability.

The high purity aluminum carbide produced by the process is useful in the production of pure methane and also finds utility as a general reducing agent.

As a specific example of the operation of the process, 57.2 grams of powdered 99.9 per cent aluminum were mixed with 19.1 grams of powdered calcined gas carbon and placed in a reactor tube which was in turn placed in a globar furnace; an aluminum chloride vaporizer containing 66 grams of aluminum trichloride was placed in a sleeve heater and connected to the tube reactor. An inert gas source of helium was connected to the input end of the vaporizer and a pressure regulation device was placed at the outlet end of the reactor tube so that the pressure in the reactor was maintained at approximately atmospheric. A reactor temperature of about 1100° C., a vaporizer temperature of about 160° C., and an inert gas flow of 150 ml./min. were maintained for a period of about four hours. During the run 38 grams of aluminum trichloride were vaporized so that 28 grams of aluminum chloride remained in the vaporizer after the run. Three grams of the aluminum-carbon mixture were lost during the run so that the charge mixture weighed 73.2 grams on completion of the reaction. The aluminum carbide produced in the reaction was proven by test to be about 95.8 per cent pure aluminum carbide.

In the specification and appended claims, the term "aluminum material" is intended to include not only high purity aluminum, but also aluminum alloys and aluminum metal containing impurities which do not impede the reaction and from which the carbide may be readily separated.

It will be understood that it is intended to cover all changes and modifications of the example of the invention herein chosen for the purpose of illustration which do not constitute departures from the spirit and scope of the invention.

What is claimed is:

1. A method of producing aluminum carbide which comprises heating carbon and aluminum material in particulate form at a temperature of from about 900° C. to 1300° C. and at a pressure in the range from 100 to 2000 mm. Hg in the presence of vapors of a volatile aluminum halide, to form aluminum carbide.

2. A method of producing aluminum carbide which comprises heating powdered carbon and powdered aluminum material at a temperature of from 900 to 1300° C. and at a pressure on the order of atmospheric in the presence of a gaseous aluminum trihalide selected from the group consisting of the chloride, bromide, iodide and mixtures thereof.

3. A method according to claim 2 in which the gaseous trihalide is aluminum trichloride.

4. A method of producing aluminum carbide which comprises the steps of mixing finely-divided carbon with finely-divided aluminum material, contacting the mixture with vapors of a volatile aluminum halide, and heating the mixture at a temperature of from 900 to 1300° C. and at a pressure in the range from 100 to 2000 mm. Hg until the reaction is substantially complete.

5. A method of producing aluminum carbide which comprises the steps of mixing finely-divided carbon with finely-divided aluminum material, passing an atmosphere comprising vapors of a volatile aluminum trihalide in an inert carrier gas over the mixture, and heating the mixture at a temperature of from about 900° C. to about 1300° C. and at a pressure in the range from 100 to 2000 mm. Hg until the reaction is substantially complete.

6. A method of producing aluminum carbide which comprises the steps of placing finely-divided aluminum material and finely-divided carbon in spaced relation in a reaction zone, heating the contents of the reaction zone at a temperature from about 900° C. to 1300° C. and at a pressure in the range from 100 to 2000 mm. Hg, and during the period of heating passing an atmosphere comprising vapors of a volatile aluminum trihalide in an inert carrier gas successively over the aluminum material and carbon in the reaction zone to react the carbon with the halide-containing atmosphere, thereby forming aluminum carbide.

7. A method of producing aluminum carbide which comprises the steps of placing powdered aluminum material and powdered carbon in spaced relation in a reaction zone, heating the contents of the reaction zone at a temperature of about 900° to 1300° C. and at a pressure in the range from 100 to 2000 mm. Hg, and contacting the heated aluminum with gaseous aluminum trichloride to allow the aluminum metal to react with the trichloride vapor to form aluminum monochloride, the latter then being passed over the powdered carbon and reacted with the carbon to form aluminum carbide.

8. A method of producing high purity aluminum carbide which comprises the steps of mixing powdered high purity aluminum with powdered high purity carbon, heating the mixture at about 1100° C. and at a pressure in the range from 100 to 2000 mm. Hg, and passing vapors of a volatile aluminum trihalide over the heated mixture until the reaction is substantially complete to form aluminum carbide.

9. A method of producing high purity aluminum carbide which comprises the steps of mixing powdered high purity aluminum with powdered high purity carbon, heating the mixture at about 1100° C. and under a pressure on the order of atmospheric, and passing an atmosphere comprising gaseous aluminum trichloride over the heated mixture until the reaction is substantially complete to form aluminum carbide.

10. A method of producing high purity aluminum carbide which comprises the steps of mixing high purity powdered aluminum with powdered high purity carbon and heating the mixture at approximately 1100° C. and approximately atmospheric pressure while contacting the heated mixture with gaseous mixture of aluminum trichloride and inert carrier gas to form aluminum carbide.

11. A method of producing high purity aluminum carbide which comprises the steps of mixing about 3 to 4 parts powdered high purity aluminum with 1 part powdered high purity carbon, heating the mixture to about 1100° C. and under atmospheric pressure, and passing an atmosphere comprising gaseous aluminum trichloride and helium gas over the heated mixture until the reaction is substantially complete to form aluminum carbide.

12. A method of producing high purity aluminum carbide which comprises the steps of placing at least 4 parts powdered high purity aluminum and 1 part powdered high purity carbon in spaced relation in a reaction zone, heating the reaction zone under atmospheric pressure at approximately 1100° C. and for a period of about 4 hours while passing an atmosphere comprising gaseous aluminum trichloride and helium as an inert carrier gas successively over the aluminous material and carbon in the reaction zone, to form aluminum carbide.

PAULINE BAILEY HEIM,
*Executrix of the estate of Charles C. Heim, deceased.*

References Cited in the file of this patent

UNITED STATES PATENTS

| Number | Name | Date |
|---|---|---|
| 1,219,797 | Barnett et al. | Mar. 20, 1917 |
| 1,222,593 | Barnett et al. | Apr. 17, 1917 |
| 1,270,226 | Smith et al. | June 18, 1918 |

OTHER REFERENCES

Chem. Abstracts, vol. 2, 1907, page 960.
Chem. Abstracts, vol. 33, April–June 1937, page 2430.